April 5, 1932.  J. R. FARR  1,852,962
HOSE COUPLING
Filed Sept. 29, 1931   2 Sheets-Sheet 1
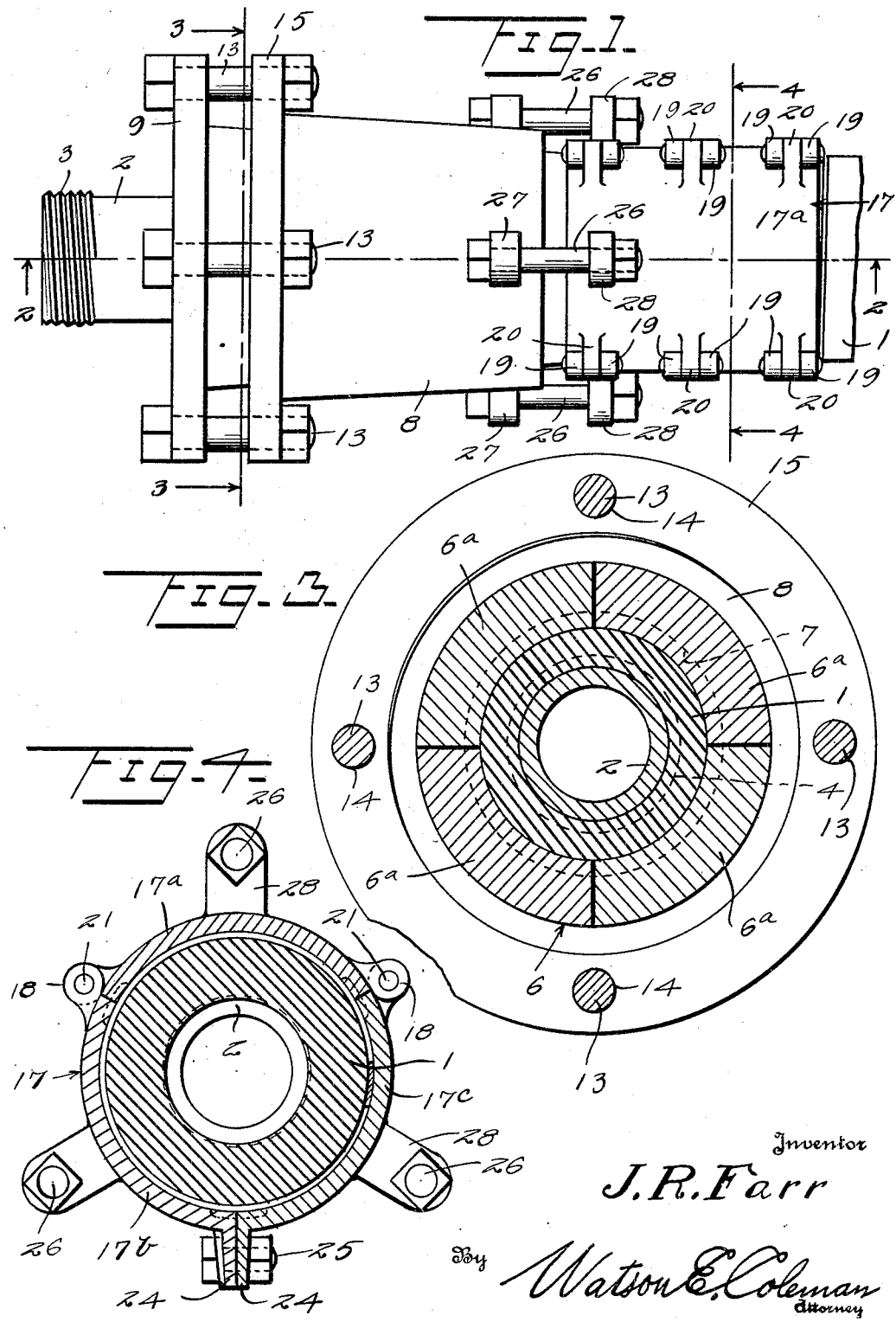
Inventor
J.R.Farr
By Watson E. Coleman
Attorney

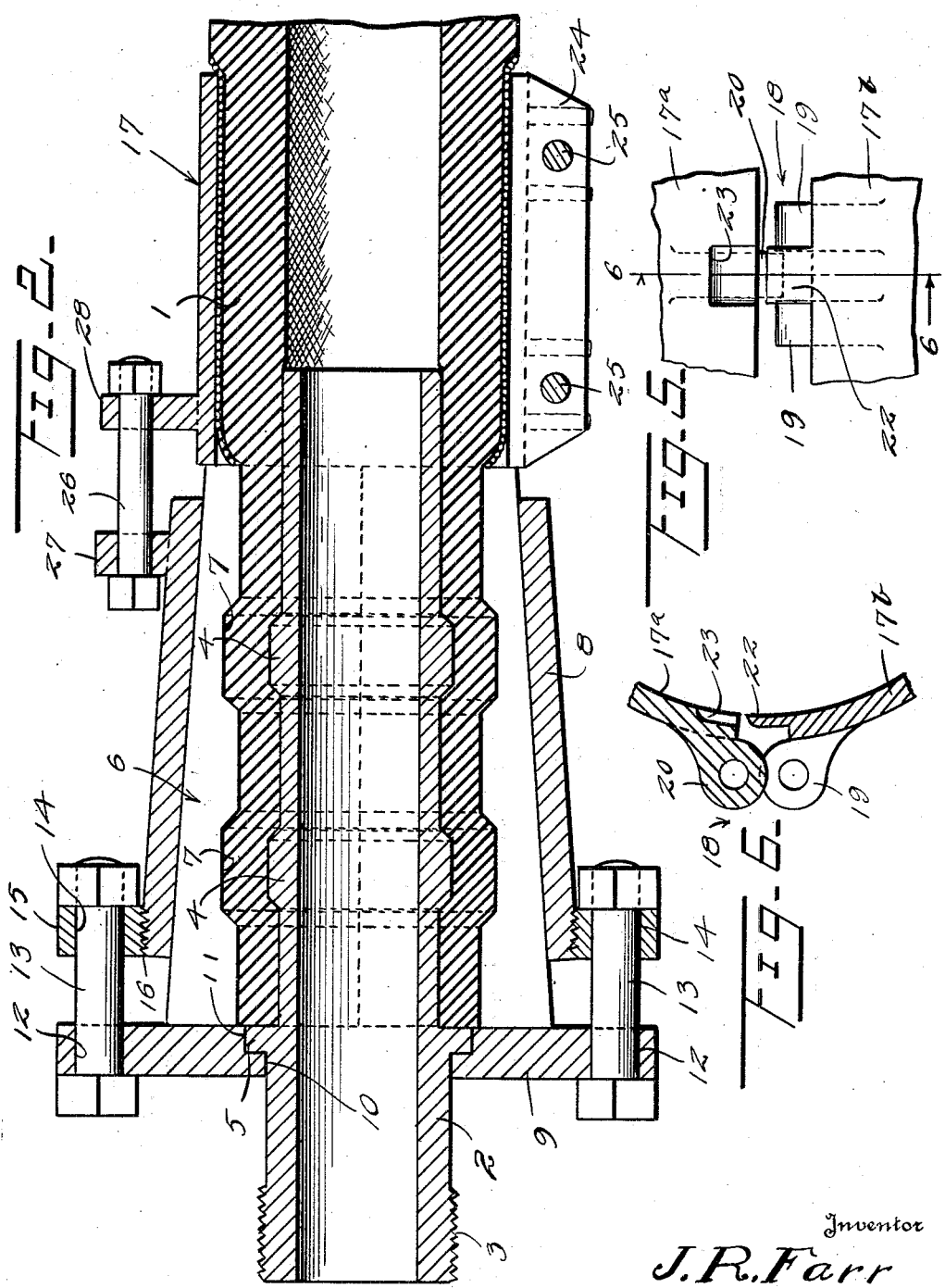

Patented Apr. 5, 1932

1,852,962

UNITED STATES PATENT OFFICE

JAMES R. FARR, OF LOS ANGELES, CALIFORNIA

HOSE COUPLING

Application filed September 29, 1931. Serial No. 565,867.

This invention relates to hose couplings of that type embodying a nipple having a portion thereof located in the hose and having its outer end screw threaded, and a clamp surrounding and binding the hose to the coupling. Couplings of this type are objectionable due to the fact that a leak develops between the nipple and the hose or the hose breaks at the inner end of the nipple when the pressure in the hose arises above normal.

The present invention has for one of its objects to overcome the stated and other objections to these hose couplings, and to attain this end comprehends the provision of a coupling which shall embody a clamp which shall be adapted to so firmly bind the hose on the nipple as to positively prevent abnormally high pressures from forcing liquid between the nipple and hose and which shall also embody a clamp surrounding the hose at and adjacent to the inner end portion of the nipple and functioning to prevent abnormally high pressures from breaking the hose at the inner end of the nipple.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in side elevation of a hose coupling constructed in accordance with my invention, the coupling being shown in applied position on a hose.

Figure 2 is a longitudinal sectional view on an enlarged scale taken on the plane indicated by the line 2—2 of Figure 1.

Figure 3 is a transverse sectional view on an enlarged scale taken on the plane indicated by the line 3—3 of Figure 1.

Figure 4 is a transverse sectional view on an enlarged scale taken on the plane indicated by the line 4—4 of Figure 1.

Figure 5 is an elevational view of a fragmentary portion of the clamp for preventing the breaking of the hose at the inner end of the nipple, this view illustrating the construction of the hinges by which the sections of the clamps are connected together, and Figure 6 is a sectional view taken on the plane indicated by the line 6—6 of Figure 5.

Referring in detail to the drawings, 1 designates a fragmentary portion of a hose, and 2 the nipple of the hose coupling. The nipple 2 has the greater portion thereof located in the hose 1, and is provided at its outer end with screw threads 3. The nipple 2 is provided with outer annular shoulders 4 and an outer annular flange 5. The shoulders 4 are relatively spaced, and are located on that portion of the nipple 2 located within the hose 1. The flange 5 is located outwardly of the hose 1 and contacts with the outer end of the latter.

A segmental wedge sleeve 6 having an inner cylindrical surface and a tapered outer surface embraces the greater part of that portion of the hose 1 surrounding the nipple 2, and is provided in its inner surface with annular grooves 7 registering with the shoulders 4. A one-piece sleeve 8 of conical formation, surrounds the wedge sleeve 6, and is adapted to contract the wedge sleeve when moved longitudinally thereon in the direction of the outer end thereof. The contraction of the wedge sleeve 6 forces the hose 1 in the direction of the nipple 2 with the result that the nipple shoulders 4 will be embedded in the hose and portions of the hose forced into the wedge sleeve groove 7 and with the result that all portions of that part of the hose surrounding the nipple will be held in firm contact therewith.

A disk 9 is mounted upon the nipple 2 outwardly of the hose 1, and the opening 10 formed in the disk for the reception of the nipple is counter bored at its inner side to provide a recess 11 for the reception of the nipple flange 5. The disk 9 extends radially beyond the contracting sleeve 8, and is provided near its periphery with openings 12 for the reception of bolts 13 which pass through openings 14 formed in a ring 15 screw threadedly engaged, as at 16, with the outer end portion of the contracting sleeve. The heads of the bolts 13 contact with the outer side of the disk 9, and the nuts of the bolts contact with the inner side of the ring 15, to the end that the sleeve 8 may be moved in a direction to contract the wedge sleeve 6 and to the end that the contracting sleeve may be held against accidental movement from its adjusted position.

The wedge sleeve 6 extends from the outer end of the hose 1 to a point short of the inner end of the nipple 2, and a cylindrical clamp 17 surrounding the hose extends from the inner end of the wedge sleeve to a point inwardly beyond the inner end of the nipple 2. The clamp consists of three arcuate sections hinged together at their longitudinal edges, and two of the sections are longer than the remaining section, to the end that the clamp may be readily applied to the hose 1. The shorter clamp section is designated 17a, and the longer clamp sections are designated 17b and 17c, respectively. The hinges 18 through the medium of which the clamp sections are connected together, are similar and each consists of a pair of spaced lugs 19, a lug 20 arranged between said first lugs, and a pin 21 passing through the lugs, the lugs 19 being formed integrally with the sections 17b and 17c, and the lugs 20 being formed integrally with the section 17a. Tongues 22 extend across the meeting edges of the sections of the clamp 17, the tongues being formed integrally with certain of the sections and fitting in recesses 23 formed in the others, and the tongues functioning to prevent the pinching of the hose 1 between the meeting edges of the sections during the application of the clamp. The sections 17b and 17c are provided at their meeting edges with outwardly directed flanges 24 for the reception of bolts 25 by which the clamp sections are secured in closed relation about the hose 1. The clamp 17 is held against inward displacement on the hose 1 by bolts 26 which pass through lugs 27 extending radially from the contracting sleeve 8 and lugs 28 extending radially from the clamp sections.

In practice, the coupling is applied by first inserting the nipple 2 in the hose until the flange 5 of the nipple contacts with the end of the hose. The contracting sleeve 8 is then applied to the hose in a position to permit the wedge sleeve sections 6a to be positioned between the hose and contracting sleeve. After this has been done the disk 9 is applied to the nipple 2 in position to contact with the flange 5, the end of the hose and the outer ends of the wedge sleeve sections 6a. The bolts 13 are then applied to the disk 9 and ring 15, and the nuts of the bolts are turned up to move the contracting sleeve 8 on the wedge ring sections 6a in the direction of the disk 9. During this adjustment of the contracting sleeve 8 the wedge ring sections 6a are held against endwise movement, with the result that the wedge ring sections will be contracted about the hose, the contraction of the wedge ring sections so firmly clamping the hose on the nipple 2 as to positively prevent liquid from being forced between the nipple and the hose. The clamp 17 is then applied to the hose and secured to the contracting sleeve 8 by the bolts 26. The clamp 17 will, since it surrounds the hose about the inner end portion of the nipple 2 and for a distance inwardly beyond the inner end of the nipple, positively prevent the hose from breaking at the inner end of the nipple.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A hose clamp comprising a nipple, a segmental wedge sleeve surrounding the nipple, a contracting sleeve surrounding the wedge sleeve, contracting sleeve adjusting means engaged with said sleeve and the nipple, the wedge sleeve terminating short of the inner end of the nipple, a clamp surrounding the inner end portion of the nipple and extending inwardly beyond the same, and means securing the clamp to the contracting sleeve.

2. A hose clamp comprising a nipple, a segmental wedge sleeve surrounding the nipple, a contracting sleeve surrounding the wedge sleeve, contracting sleeve adjusting means engaged with said sleeve and the nipple, the wedge sleeve terminating short of the inner end of the nipple, a clamp consisting of three hinged sections surrounding the inner end portion of the nipple and extending inwardly beyond the same, means securing the clamp sections in closed relation, and means securing the clamp to the contracting sleeve.

3. A hose clamp comprising a nipple, a segmental wedge sleeve surrounding the nipple, a contracting sleeve surrounding the wedge sleeve, contracting sleeve adjusting means engaged with said sleeve and the nipple, the wedge sleeve terminating short of the inner end of the nipple, a clamp surrounding the inner end portion of the nipple and extending inwardly beyond the same, and means securing the clamp to the contracting sleeve, said means consisting of lugs carried by the contracting sleeve, lugs carried by the clamp, and bolts engaged with the lugs.

In testimony whereof I hereunto affix my signature.

JAMES R. FARR.